(12) United States Patent
Chen

(10) Patent No.: US 11,507,679 B2
(45) Date of Patent: *Nov. 22, 2022

(54) AUTHORIZATION METHOD FOR FORM RELATED INFORMATION

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

( * ) Notice: Subject to any disclaimer, the term of this patent is extended or adjusted under 35 U.S.C. 154(b) by 210 days.

This patent is subject to a terminal disclaimer.

(21) Appl. No.: 16/627,992

(22) PCT Filed: Jun. 20, 2018

(86) PCT No.: PCT/CN2018/092033
§ 371 (c)(1),
(2) Date: Dec. 31, 2019

(87) PCT Pub. No.: WO2019/007210
PCT Pub. Date: Jan. 10, 2019

(65) Prior Publication Data
US 2020/0218818 A1    Jul. 9, 2020

(30) Foreign Application Priority Data

Jul. 1, 2017   (CN) .................. 201710529346.4

(51) Int. Cl.
*G06F 21/00* (2013.01)
*G06F 21/62* (2013.01)
(Continued)

(52) U.S. Cl.
CPC .......... *G06F 21/6218* (2013.01); *G06F 21/64* (2013.01); *G06Q 10/105* (2013.01); *G06F 2221/2141* (2013.01)

(58) Field of Classification Search
CPC ............... G06F 21/6218; G06F 21/64; G06F 2221/2141; G06F 21/30; G06F 21/62; G06Q 10/105; G06Q 10/10; G06Q 10/103
See application file for complete search history.

(56) References Cited

U.S. PATENT DOCUMENTS 7,703,021 B1   4/2010   Flam
7,734,999 B2   6/2010   Leung
(Continued)

FOREIGN PATENT DOCUMENTS

CN   101299694 A   11/2008
CN   101520875 A   9/2009
(Continued)

OTHER PUBLICATIONS

International Search Report in the international Application No. PCT/CN2018/092033, dated Sep. 5, 2018.
(Continued)

*Primary Examiner* — Andrew J Steinle
(74) *Attorney, Agent, or Firm* — Ladas & Parry, LLP

(57) ABSTRACT

A method for authorizing form related information is provided including: selecting one or more grantees; selecting a form, and displaying candidate related information of said form, wherein when there is one grantee, items selected and saved in the candidate related information when the grantee is authorized last time are automatically shown as being selected, and modifying authorization or selecting a corresponding item from said candidate related information for authorization; when there are two or more grantees, no item
(Continued)

is shown as being selected, selecting and authorizing a corresponding item from said candidate related information; and after authorizing the related information of the form to the selected one or more grantees, saving the authorization of the related information of the selected form.

8 Claims, 5 Drawing Sheets

(51) Int. Cl.
    G06F 21/64      (2013.01)
    G06Q 10/10     (2012.01)

(56) References Cited

U.S. PATENT DOCUMENTS

| | | | |
|---|---|---|---|
| 2004/0006594 | A1 | 1/2004 | Boyer |
| 2010/0042680 | A1* | 2/2010 | Czyzewicz ........... H04L 67/306 709/203 |
| 2011/0162046 | A1 | 6/2011 | Forster |
| 2011/0246867 | A1 | 6/2011 | Tsutsumi |
| 2012/0036263 | A1 | 2/2012 | Madden |
| 2015/0106736 | A1* | 4/2015 | Torman ................ G06F 16/907 715/745 |
| 2018/0018448 | A1* | 1/2018 | Schulze ................ H04L 63/105 |
| 2018/0197624 | A1* | 7/2018 | Robaina ................ G06F 3/017 |

FOREIGN PATENT DOCUMENTS

| | | |
|---|---|---|
| CN | 101673375 A | 3/2010 |
| CN | 102004868 A | 4/2011 |
| CN | 102902767 A | 1/2013 |
| CN | 103530537 A | 1/2014 |
| CN | 104050395 A | 9/2014 |
| CN | 10463005 A | 3/2015 |
| CN | 104838386 A | 8/2015 |
| CN | 105630759 A | 6/2016 |
| CN | 105868357 A | 8/2016 |
| CN | 107292588 A | 10/2017 |
| CN | 107330344 A | 11/2017 |
| JP | 2010020525 A | 1/2010 |
| KR | 20160084997 A | 7/2016 |

OTHER PUBLICATIONS

Written Opinion of the International Searching Authority in the international Application No. PCT/CN2018/092033, dated Sep. 5, 2018 and English translation provided by Google Translate.
International Search Report in the international application No. PCT/CN2018/093815, dated Sep. 21, 2018.
Written Opinion of the International Searching Authority in the international application No. PCT/CN2018/093815, dated Sep. 21, 2018 and English translation provided by Google Translate.
International Preliminary Report on Patentability (Chapter II) from PCT/CN2018/093815 dated Oct. 14, 2019.
Notice of Allowance from Chinese Patent Application No. 201810637427.0 dated Apr. 8, 2021.
Office Action from Chinese Patent Application No. 201810637427.0 dated Jan. 28, 2021.
Office Action from Chinese Patent Application No. 201810637427.0 dated Jun. 10, 2020 and search report.
Office Action from U.S. Appl. No. 16/627,990 dated Apr. 13, 2022.
International Preliminary Report on Patentability (Chapter II) from PCT/CN2018/092033 dated Sep. 26, 2019.

* cited by examiner

| Grantee | Form | Last authorization operator: Zhang Er; Operation time: 2017-5-6, 15:00 | | | | |
|---|---|---|---|---|---|---|
| | | Field: Industry to which the customer belongs | Candidate relation information | | | |
| | | | Related forms | | Related statistics | |
| | | | Contract form | Order form | Shipping statistics | Receiving statistics |
| General manager office √ Clerk 1 Clerk 2 Clerk 3 ...... | √ Customer contract ...... | Manufacturing industry | √ | | √ | |
| | | Financial industry | | | | |
| | | Aircraft industry | | √ | | |

FIG. 5

| Grantee | Form | Last authorization operator: Zhang Er; Operation time: 2017-5-6, 15:00 | | | | | |
|---|---|---|---|---|---|---|---|
| | | Authorization template: Created template 1 | | | | | |
| | | Candidate relation information | | | | | |
| General manager office | | Related forms | | | Related statistics | | |
| √ Clerk 1<br>Clerk 2<br>Clerk 3<br>...... | √ Customer contract | Contract form | Order form | ...... | Shipping statistics | Receiving statistics | ...... |
| Template<br>Created template 1<br>Created template 2<br>Created template 3<br>...... | ...... | √ | | | √ | | |

FIG. 7

AUTHORIZATION METHOD FOR FORM RELATED INFORMATION

CROSS-REFERENCE TO RELATED APPLICATIONS

This application is the U.S. national phase of PCT/CN2018/092033 filed on Jun. 20, 2018, which claims priority to Chinese Application No. 201710529346.4 filed on Jul. 1, 2017, the disclosures of which are incorporated by reference herein in their entireties.

BACKGROUND

Technical Field

The present invention relates to a form-authorizing method in a management software system such as ERP, and in particular, to a method for authorizing form-related information.

Related Art

In a conventional management software system such as ERP, viewing permissions of the related forms and statistics of a form cannot be authorized respectively. Authorizing a related form in a conventional software only controls a viewing function based on the authorization of the related form itself. In actual control, such authorization cannot exactly achieve mutual matching between the form permissions required in management. For example, when Li Si is authorized, a customer at place A is authorized by a customer form, a contract at place A is not authorized in a contract form, and an order at place A is not authorized in an order form either (this is the authorization of an independent form). After Li Si is authorized as above, there are two processing methods when Li Si clicks relation information of a customer: In one method, the customer's related contract and order are hidden (this method is under the permission control of the contract and order forms); related forms and related statistics cannot be authorized to users accordingly. For example, a customer form may be related to a contract, an order, a production form, a shipping form, an installation form, an aftersales form, and the like, but the conventional method cannot achieve authorizing user Li Si to only view the contract related to the customer and authorizing user Zhang San to view the related installation form and the aftersales form.

In the other method, the customer's related contract and order are viewable (this method is neither under the permission control of the contract and order nor other methods, and all relation information are viewable by default). If one order involves multiple contracts, the order information of other contracts (these contracts even belong to different customers) are viewable in all the involved contracts, and such sensitive information may cause unnecessary loss to the company.

In addition, it is to directly authorize a form to each employee in the conventional method. When the employee is transferred from a post, it needs to re-authorize a form to the employee. When the form has much relation information, the workload is large and the efficiency is low; moreover, it is difficult to achieve exact authorization matching between forms.

SUMMARY

Technical Problems

The object of the present invention is to overcome the deficiencies of the prior art, and provide a method for authorizing form-related information.

Solutions to Problems

Technical Solutions

The object of the present invention is achieved by the following technical solutions: A method for authorizing form-related information includes: selecting a grantee; selecting a form, wherein a form is selected, and the candidate relation information of said form is displayed; authorizing the relation information of the form to the grantee, wherein when there is one grantee, in said candidate relation information, items thereof that are selected and saved in the candidate relation information when the grantee is authorized at last time are automatically selected, and a corresponding item is selected from said candidate relation information; when there are two or more grantees, in said candidate relation information, no item thereof is selected, and a corresponding item is selected from said candidate relation information; and after authorizing the relation information of the form to the grantee, saving the permissions of the relation information of the grantee's form.

Preferably, said grantee includes one or more types of a person, a user, a group, a class, and a role.

Preferably, said role is an independent individual not a group/a class, one role can only be related to a unique user during the same period, and one user is related to one or more roles.

Preferably, said role belongs to a certain department, and the role is authorized according to the work content of the role; a name of the role is unique under the department, and a number of the role is unique in a system; and during cross-department transfer of said user, the user's relation to the role in the original department is canceled, and the user is related to a role in a new department.

Preferably, said candidate relation information includes at least one of a related form and related statistics.

Preferably, said method for authorizing form-related information further includes a step of setting the candidate relation information.

Preferably, when there is one grantee, after the grantee and the form are selected, an authorization operator and an authorization time that the grantee's form is authorized at last time are displayed.

A method for authorizing form-related information includes: selecting a grantee; selecting a form, wherein a form is selected, and the candidate relation information of said form is displayed; selecting a field, wherein a field that needs to operate a permission is selected in the form, and the selected field should be the field, the value of which is determined by selection or determined automatically; authorizing the relation information of the form to the grantee, wherein a corresponding item is selected from all items that correspond to all field values of the selected field respectively in said candidate relation information; and after authorizing the relation information of the form to the grantee, saving the permissions of the relation information of the grantee's form.

Preferably, when there is one grantee, in said candidate relation information, items thereof that are selected and saved when the grantee is authorized at last time are automatically selected; and when there are two or more grantees, in said candidate relation information, no item thereof is selected.

A method for authorizing form-related information includes: selecting a grantee; selecting a form, wherein a form is selected, and candidate relation information of said form is displayed; selecting an authorization template, wherein an existing role or a created template is selected as an authorization template; authorizing form-related information to a grantee, wherein in the candidate relation information, items thereof that are selected and saved when the authorization template is authorized at last time are automatically selected, and a corresponding item is selected from said candidate relation information; and after authorizing the relation information of the form to the grantee, saving the permissions of the relation information of the grantee's form.

Beneficial Effects of the Invention

Beneficial Effects

The present invention has the following beneficial effects: (1) The present invention can achieve respective authorization of permissions to view related forms and related statistics of a form. While a customer form is authorized, the related forms/the related statistics of the customer form can be authorized at the same time. For example, when a customer form is authorized to Zhang San, a contract form, an order form, shipping statistics, and the like related to the customer form are displayed. In this case, Zhang San can be authorized to view a "related contract". Then, when viewing related information of a customer, Zhang San can view the contract information related to the customer, but cannot view the order and the shipping statistics information of the customer. The present application resolves authorization matching vulnerabilities between forms, the vulnerabilities possibly occur in the prior art when viewing the relation information between forms is controlled by using independent form permissions. The present application also resolves the problem in the prior art that relation information cannot be viewed selectively (all relation information is viewable by default conventionally).

In the present application, when a form is authorized, the related forms/statistics of the form are displayed to be selected for authorization, and these related statistics are only statistics about the data information related to the contract, thus avoiding unnecessary information leakage of the company and possible loss.

(2) The user obtains permissions through a role. After taking up a post and being related to a role, an employee can obtain the relation information permissions of a form authorized to the related role, and it is unnecessary to separately authorize the relation information of the form to the new employee. When the employee is transferred from the post, it only needs to cancel the role currently related to the transferred employee and then relate a new role to the employee after transferred. The employee can obtain the relation information permissions of the form required for the current work through the new role, and it is unnecessary to authorize the relation information of the form of the new post to the employee separately. If the relation information permissions of the employee's form need to be adjusted, it only needs to adjust the relation information permissions of the form of the employee's related role.

(3) When one grantee is authorized, in the candidate relation information, items thereof that are selected and saved when the grantee is authorized at last time are automatically selected, so that an operator can make modifications on this basis to authorize the relation information of the form. Two or more grantees can be authorized at the same time, thus improving the efficiency of authorizing relation information of the form to batch grantees with exactly or mostly the same permissions.

(4) When there is one grantee, after the grantee is selected, the operator and the authorization time that the grantee is authorized at last time are displayed, which helps to track accountability when an error occurs in the grantee's permissions and determine whether to authorize the grantee.

(5) The conventional permission management mechanism defines the nature of a group, a type of work, a class or the like as the role. The role is in a one-to-many relation to the user. In the actual process of using a system, the user's permissions often need to be adjusted during the operation process. For example, in processing the change of an employee's permissions, when the permissions of an employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method in the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (after the permissions of the user/role have changed dynamically), the solutions in the present application can significantly improve the permission management efficiency for the system user in using the system, make the dynamic authorization simpler, more convenient, clearer and more explicit, and improve the efficiency and reliability of the permission setting.

(6) The conventional group-based role authorization method is prone to errors. The method provided in the present application significantly reduces the probability of authorization errors, because the method of the present application only needs to consider the role as an independent individual, without considering the commonality of multiple users related to the role having the nature of a group under the conventional method. Even if the authorization errors occur, only the user related to the role is affected. However, in the case of the conventional role having the nature of a group, all users related to the role are affected. Even if the authorization errors occur, the correction method in the present application is simple and takes a short time, while in the case of the conventional role having the nature of a group, the commonality of the permissions of all users related to the role needs to be considered during the error correction. The modification is cumbersome, complex, and error-prone when there are many function points, and in many cases, the problem cannot be solved unless a new role is created.

(7) In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a station number, such that the selection can be made easily.

(8) When a user is transferred from a post, if many permissions of the transferred user need to be assigned to other users, in processing, it is necessary to distinguish the permissions of the transferred user and creating roles to relate to other users respectively. The operations are complicated, time-consuming, and prone to errors.

The method in the present application is as follows: The transferred user is related to several roles. When the user is transferred, the relation between the user and the roles in the original department is first canceled (the canceled roles may be re-related to other users), and then the user is related to a role in a new department. The operation is simple and not error-prone.

(9) The role belongs to a department, and then the department to which the role belongs cannot be replaced. Reasons why the department to which the role belongs cannot be replaced are as follows. Reason 1: As the role in the present application is equivalent to a station number or a post number in nature, different station numbers or post numbers have different work content or permissions. For example, the role of a salesperson 1 under a sales department and the role of a developer 1 under a technical department are two completely different station numbers or post numbers, and have different permissions. Reason 2: If the department (sales department) to which the role of the salesperson 1 belongs is replaced by the technical department without changing the permissions of the role of the salesperson 1, the role that owns the permissions of the sales department exists in the technical department. This leads to management confusion and security vulnerabilities.

BRIEF DESCRIPTION OF THE DRAWINGS

Description of the Drawings

Figures 1, 2:
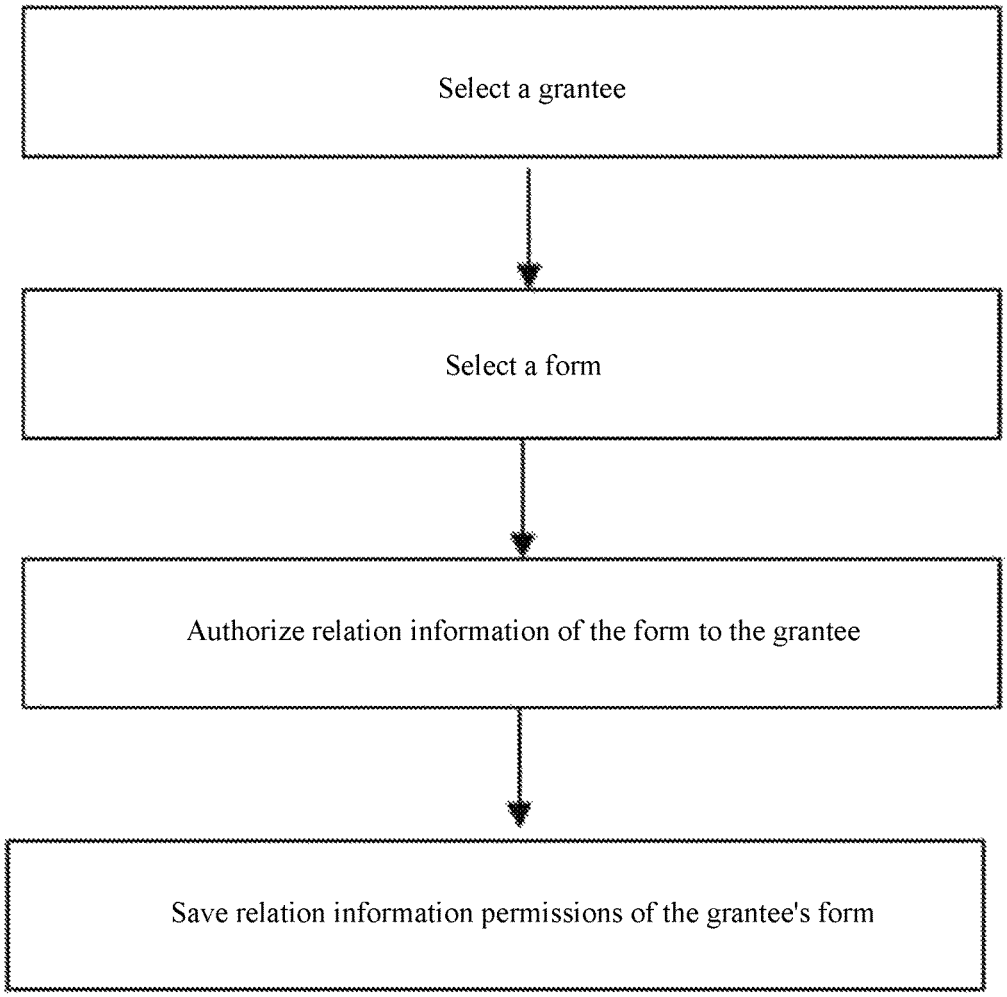
Figures 3, 4:
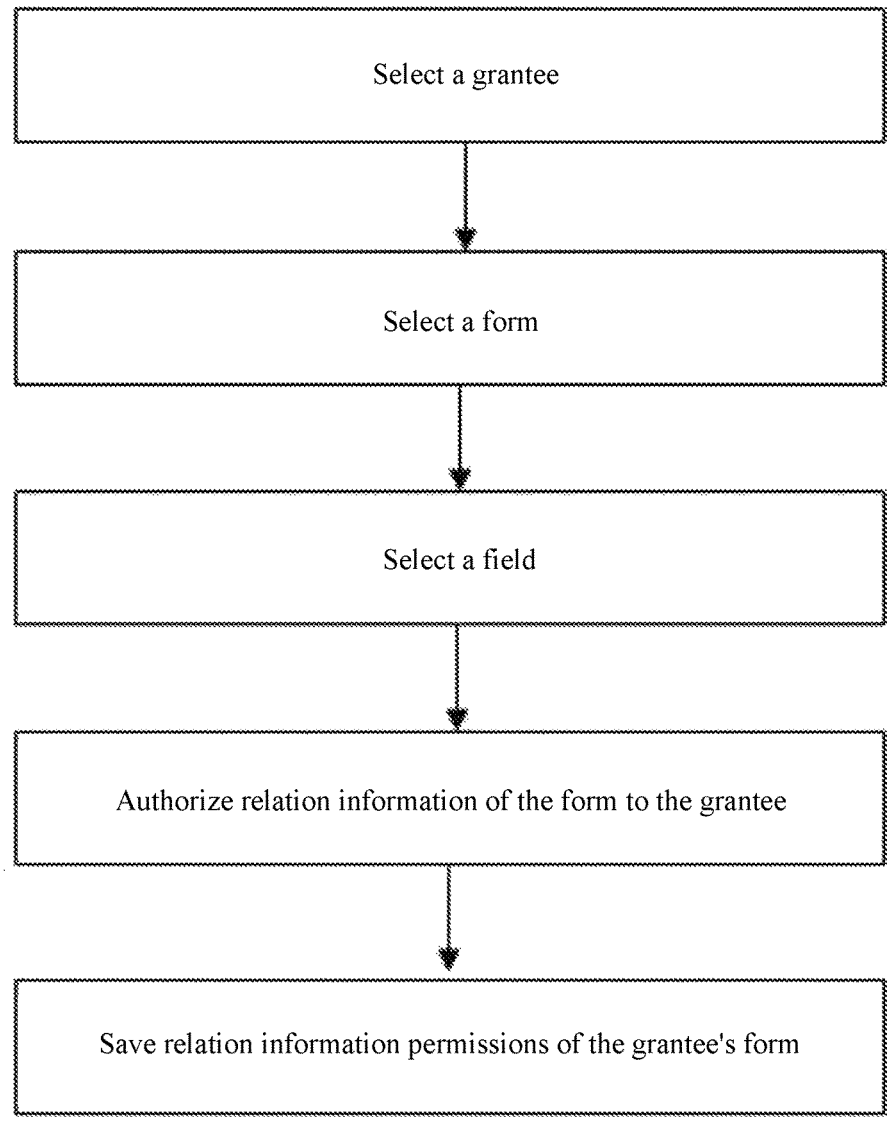
Figure 6:
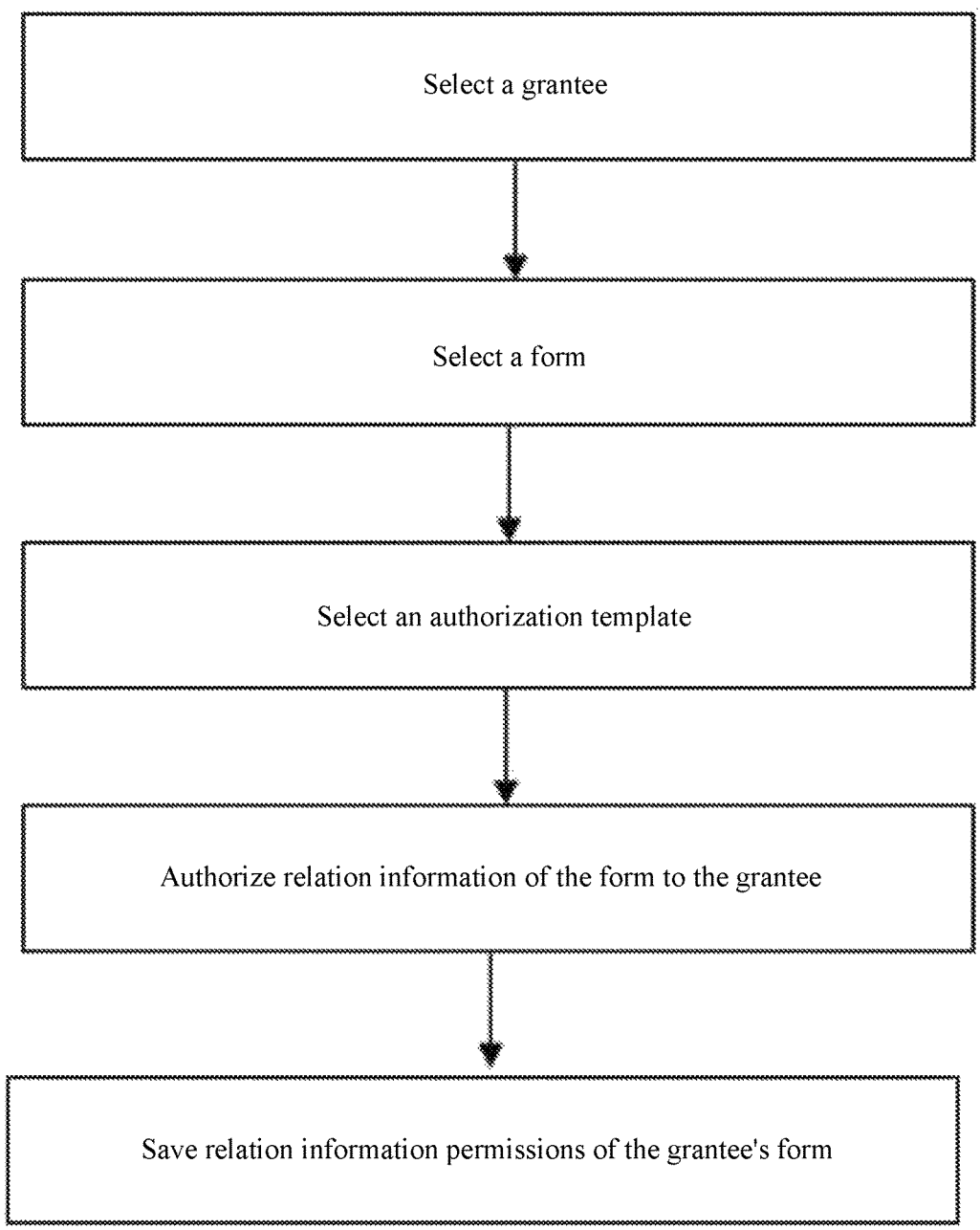

FIG. 1 is a flowchart of an embodiment in the present invention;

FIG. 2 is a schematic diagram with one grantee in the present invention;

FIG. 3 is a schematic diagram with two grantees in the present invention;

FIG. 4 is a flowchart of another embodiment in the present invention;

FIG. 5 is a schematic diagram of authorization performed according to a field in the present invention;

FIG. 6 is a flowchart of still another embodiment in the present invention; and FIG. 7 is a schematic diagram of authorization performed according to an authorization template in the present invention.

DETAILED DESCRIPTION

Description of Embodiments

The technical solutions of the present invention will be further described in detail below with reference to the figures, but the protection scope of the present invention is not limited to the following descriptions.

Embodiment 1

As shown in FIG. 1, a method for authorizing form-related information includes: selecting a grantee. The grantee includes one or more types of a person, a user, a group, a class, and a role.

The role is an independent individual not a group/a class, one role can only be related to a unique user during the same period, and one user is related to one or more roles.

The role belongs to a certain department, and the role is authorized according to the work content of the role; the name of the role is unique under the department, and the number of the role is unique in a system. The user determines (obtains) permissions through its relation to the role, one employee corresponds to one user, and one user corresponds to one employee.

Definition of a role: A role does not have the nature of a group/a class/a category/a post/a position/a type of work or the like, but has a non-collective nature. The role is unique and is an independent individual. Applied to an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/a station number, and is also similar to the role in a film and television drama: one role (in childhood, juvenile, middle-age . . . ) can be played by only one actor or actress during the same period, but one actor or actress may play multiple roles.

During cross-department transfer of the user, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

A form is selected: selecting a form and displaying the candidate relation information of the form.

The candidate relation information includes at least one of a related form and related statistics, thus achieving respective authorization of permissions to view the related forms and related statistics of the form. For example, while a customer form is authorized, the related forms/the related statistics of the customer form can be authorized at the same time, and thus it resolves authorization matching vulnerabilities between forms. The vulnerabilities possibly occur in the prior art when viewing the relation information between forms is controlled by using independent form permissions. It also resolves the problem in the prior art that relation information cannot be viewed selectively (all relation information is viewable by default conventionally). For example, when a customer form is authorized to Zhang San, a contract form, an order form, shipping statistics, and the like related to the customer form are displayed. In this case, Zhang San can be authorized to view the contract form related to the customer form. Then, when viewing the related information of a customer (for example, the customer's relation information or the link of the customer's relation information is displayed in an interface for displaying the customer's information, so that Zhang San directly views the information or clicks the link to view the information), Zhang San can view the contract information/content related to the customer, but cannot view other information/content of the customer, such as order and shipping statistics (it is conventionally assumed by default that the customer's relation information includes contract information, order information, shipping statistics, and the like, and Zhang San can view all the related contract information, order information, shipping statistics, and the like through the relation).

When a form is authorized, the related forms/the statistics of the form are displayed to be selected for authorization, and these related statistics are only statistics about the data information related to the contract, thus avoiding unnecessary information leakage of the company and possible loss.

The method for authorizing form-related information further includes a step of setting the candidate relation information, so that the candidate relation information can be set according to actual needs, thus improving the adaptability.

The relation information of a form is authorized to the grantee. When there is one grantee, in the candidate relation information, items thereof that are selected and saved when the grantee is authorized at last time are automatically selected, and a corresponding item is selected from the candidate relation information. As shown in FIG. 2, a clerk 1 has been selected as a grantee and in the candidate relation information, items thereof that are selected and saved when the clerk 1 is authorized at last time are a contract form and shipping statistics, and in this case, the contract form and the shipping statistics are selected automatically. The last authorization is completed by Zhang Er at 15:00 on May 6, 2017. When there are two or more grantees, in the candidate relation information, no item thereof is selected, and a corresponding item is selected from the candidate relation information. As shown in FIG. 3, a clerk 1 and a clerk 2 are selected as grantees at the same time, and in this case, in the candidate relation information, no item thereof is selected.

When there is one grantee, after the grantee and the form are selected, an authorization operator and an authorization time that the grantee's form is authorized at last time are displayed, which helps to determine whether the grantee needs to be authorized. For example, an operator needs to authorize 100 roles; however, the operator only finished authorizing 70 roles on that day. When the operator continued to authorize the role on the next day, a role to be authorized can be found by screening the authorization operators or the time of the last authorization of the relation information of the form. For another example, by viewing the last time when a role is authorized, it can be known how long the permissions of the role have remained unchanged, which helps to determine intuitively whether to re-authorize the role.

After the relation information of the form is authorized to the grantee, the permissions of the relation information of the grantee's form are saved.

It should be noted that a grantee may be selected before a form is selected, or a grantee may be selected after a form is selected, or a grantee and a form may be selected simultaneously.

Embodiment 2

As shown in FIG. 4, a method for authorizing form-related information includes: selecting a grantee. The grantee includes one or more types of a person, a user, a group, a class, and a role.

The role is an independent individual not a group/a class, one role can only be related to a unique user during the same period, and one user is related to one or more roles.

The role belongs to a certain department, and the role is authorized according to the work content of the role; the name of the role is unique under the department, and the number of the role is unique in a system. The user determines (obtains) permissions through its relation to the role, one employee corresponds to one user, and one user corresponds to one employee.

During cross-department transfer of the user, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

A form is selected: selecting a form and displaying candidate relation information of the form. The candidate relation information includes at least one of a related form and related statistics.

A field is selected: selecting a field that needs to operate a permission in the form (that is, the field, the value of which can be used for authorization), where the selected field should be the field, the value of which of is determined by selection (for example, the field values of the industry field of a customer form include options such as a manufacturing industry, a financial industry, and an aircraft industry, and is not filled manually) or determined automatically (for example, for the fields such as a form creator, a form recorder, a form making role, a form making person, and a department, these options/field values are automatically determined according to a related rule once the form data is determined/saved).

The relation information of the form is authorized to the grantee, where a corresponding item is selected from all items that correspond to all field values of the selected field respectively in said candidate relation information. As shown in FIG. 5, the selected field is the industry to which the customer belongs; all field values of the field include a manufacturing industry, a financial industry, and an aircraft industry; all items in the candidate relation information that correspond to all the field values are a contract form of the manufacturing industry, an order form of the manufacturing industry, shipping statistics of the manufacturing industry, receiving statistics of the manufacturing industry, a contract form of the financial industry, an order form of the financial industry, shipping statistics of the financial industry, receiving statistics of the financial industry, a contract form of the aircraft industry, an order form of the aircraft industry, shipping statistics of the aircraft industry, and receiving statistics of the aircraft industry.

After the relation information of the form is authorized to the grantee, the permissions of the relation information of the grantee's form are saved.

When there is one grantee, in the candidate relation information, items thereof that are selected and saved when the grantee is authorized at last time are automatically selected; and when there are two or more grantees, in the candidate relation information, no item thereof is selected.

When there is one grantee, after the grantee and the form are selected, an authorization operator and an authorization time that the grantee's form is authorized at last time are displayed, which helps to determine whether the grantee needs to be authorized.

It should be noted that, the sequence of selecting a grantee, selecting a form, and selecting a field is not limited in this embodiment, and any sequence can be used for implementation.

Embodiment 3

As shown in FIG. 6, a method for authorizing form-related information includes: selecting a grantee. The grantee includes one or more types of a person, a user, a group, a class, and a role.

The role is an independent individual not a group/a class, one role can only be related to a unique user during the same period, and one user is related to one or more roles.

The role belongs to a certain department, and the role is authorized according to work content of the role; a name of the role is unique under the department, and a number of the role is unique in a system. The user determines (obtains) permissions through its relation to the role, one employee corresponds to one user, and one user corresponds to one employee.

During cross-department transfer of the user, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

A form is select: selecting a form, and displaying the candidate relation information of the form; the candidate relation information includes at least one of a related form and related statistics.

An authorization template is selected, where an existing role or a created template is selected as an authorization template; form-related information is authorized to a grantee, where in the candidate relation information, items thereof that are selected and saved when the authorization template is authorized at last time are automatically selected, and a corresponding item is selected from the candidate relation information. As shown in FIG. 7, a clerk 1 is a grantee, and in the candidate relation information, items thereof that are selected and authorized when a created template 1 is authorized at last time are automatically selected.

After the relation information of the form is authorized to the grantee, the permissions of the relation information of the grantee's form are saved.

It should be noted that, the sequence of selecting a grantee, selecting a form, and selecting an authorization template is not limited in this embodiment, and any sequence can be used for execution.

The above is only a preferred embodiment of the present invention, and it should be understood that the present invention is not limited to the forms disclosed herein, and is not to be construed as being limited to the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. A method for authorizing form related information in a management computer system, comprising:
    selecting one or more grantees;
    selecting a form, and displaying candidate related information of said selected form;
    authorizing a related information of the selected form to the selected one or more grantees, wherein when there is one selected grantee, one or more items selected and saved from the candidate related information when the one selected grantee is authorized last time are automatically shown as being selected, modifying authorization or selecting a corresponding item from said candidate related information for authorization; when there are two or more selected grantees, no item is shown as being selected, selecting and authorizing a corresponding item from said candidate related information; and
    after authorizing the related information of the form to the selected one or more grantees, saving the authorization of the related information of the selected form;
    wherein the one or more selected grantees comprise a user and/or a role, wherein a role is independent which is not a group or a class, the role is configured to be related to a user only during a same period, and the user is configured to be related to the role or more roles, and the user is configured to obtain the authorization of the related information of the related one role or more roles.

2. The method according to claim 1, wherein said role belongs to a department, and the role is authorized according to the work content of the role; a name of the role is unique under the department, and a number of the role is unique in a system; and during cross-department transfer of said user, the user's relation to the role in an original department is canceled, and the user is related to a new role in a new department.

3. The method according to claim 1, wherein said candidate related information comprises at least one of a related form and related statistics.

4. The method according to claim 1, further comprises setting the candidate related information.

5. The method according to claim 1, wherein when there is one selected grantee, after the one grantee and the form are selected, an authorization operator and an authorization time when the form is authorized for the selected grantee last time are displayed.

6. A method for authorizing form related information in a management computer system, comprising:
   selecting one or more grantees;
   selecting a form, and displaying candidate related information of said selected form;
   selecting from the from a field that needs a permission to operate, wherein a value of the selected field should be determined by selection or determined automatically;
   authorizing a related information of the selected form to the selected one or more grantees, wherein a corresponding item is selected from all items that correspond to all field values of the selected field respectively in said candidate related information; and
   after authorizing the related information of the selected form to the one or more selected grantees, saving the authorization of the related information of the selected form;
   wherein the one or more selected grantees comprise a user and/or a role, wherein a role is independent which is not a group or a class, the role is configured to be related to a user only during a same period, and the user is configured to be related to the role or more roles, and the user is configured to obtain the authorization of the related information of the related one role or more roles.

7. The method according to claim 6, wherein when there is one selected grantee, items selected and saved when the one selected grantee is authorized last time are automatically shown as being selected, modifying authorization or selecting a corresponding item for authorization; and when there are two or more selected grantees, no item is shown as being selected, selecting and authorizing a corresponding item.

8. A method for authorizing form related information in a management computer system, comprising:
   selecting one or more grantees;
   selecting a form, and displaying candidate related information of said selected form;
   selecting a created template as an authorization template;
   authorizing a form related information to the selected one or more grantees, wherein one or more items selected and saved when the authorization template is authorized last time are automatically shown as being selected, modifying authorization or selecting a corresponding item from said candidate related information for authorization; and
   after authorizing the related information of the form to the selected one or more grantees, saving the authorization of the related information of the selected form;
   wherein the one or more selected grantees comprise a user and/or a role, wherein a role is independent which is not a group or a class, the role is configured to be related to a user only during a same period, and the user is configured to be related to the role or more roles, and the user is configured to obtain the authorization of the related information of the related one role or more roles.

* * * * *